(12) United States Patent
Cohen et al.

(10) Patent No.: US 10,087,305 B2
(45) Date of Patent: Oct. 2, 2018

(54) NUCLEATED CRYSTALLIZATION OF POLY(TRIMETHYLENE-2,5-FURANDICARBOXYLATE) (PTF) AND ARTICLES MADE THEREFROM

(71) Applicant: E. I. DU PONT DE NEMOURS AND COMPANY, Wilmington, DE (US)

(72) Inventors: Gordon Mark Cohen, Wynnewood, PA (US); Fredrik Nederberg, East Amherst, NY (US); Bhuma Rajagopalan, Wilmington, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 15/104,376

(22) PCT Filed: Dec. 18, 2014

(86) PCT No.: PCT/US2014/071060
§ 371 (c)(1),
(2) Date: Jun. 14, 2016

(87) PCT Pub. No.: WO2015/095466
PCT Pub. Date: Jun. 25, 2015

(65) Prior Publication Data
US 2016/0312001 A1   Oct. 27, 2016

Related U.S. Application Data (60) Provisional application No. 61/918,728, filed on Dec. 20, 2013, provisional application No. 62/055,730, filed on Sep. 26, 2014.

(51) Int. Cl.
| | | |
|---|---|---|
| *C08K 5/00* | (2006.01) | |
| *C08G 63/672* | (2006.01) | |
| *C08G 63/78* | (2006.01) | |
| *C08J 5/18* | (2006.01) | |
| *C08K 3/32* | (2006.01) | |
| *C08K 5/52* | (2006.01) | |
| *C08K 5/098* | (2006.01) | |

(52) U.S. Cl.
CPC .......... *C08K 5/0083* (2013.01); *C08G 63/672* (2013.01); *C08G 63/78* (2013.01); *C08J 5/18* (2013.01); *C08K 3/32* (2013.01); *C08K 5/098* (2013.01); *C08K 5/52* (2013.01); *C08G 2250/00* (2013.01); *C08J 2367/02* (2013.01); *C08K 2003/324* (2013.01)

(58) Field of Classification Search
CPC ........ C08K 5/0083; C08K 3/32; C08K 5/098; C08K 5/52; C08G 63/672; C08G 63/78; C08J 5/18
USPC .......................................................... 524/394
See application file for complete search history.

(56) References Cited

U.S. PATENT DOCUMENTS

| | | | | |
|---|---|---|---|---|
| 5,990,213 A | * | 11/1999 | Kobayashi | .............. C08K 5/12 524/288 |
| 6,063,464 A | | 5/2000 | Charbonneau et al. | |
| 6,140,422 A | | 10/2000 | Khanarian et al. | |
| 2004/0232717 A1 | | 11/2004 | Ariyasu | |

FOREIGN PATENT DOCUMENTS

| | | |
|---|---|---|
| WO | 2013/149221 A1 | 10/2013 |
| WO | 2013/149222 A1 | 10/2013 |

OTHER PUBLICATIONS

PCT International Search Report for International Application No. PCT/US2014/071060 dated Mar. 20, 2015.

\* cited by examiner

*Primary Examiner* — Ling Choi
*Assistant Examiner* — Ronald Grinsted (57) ABSTRACT

Disclosed herein are compositions and articles made therefrom, the compositions comprising poly(trimethylene-2,5-furandicarboxylate) and one or more of a plasticizer, a neutralized carboxylic acid salt or trisodium phosphate as a nucleating agent, and a copolyester derived from furandicarboxylic acid, 1,3 propanediol and at least one poly (alkylene ether) glycol (PAEG), the copolyester comprising a Furan-PAEG soft segment and a PTF hard segment.

7 Claims, 1 Drawing Sheet

NUCLEATED CRYSTALLIZATION OF POLY(TRIMETHYLENE-2,5-FURANDICARBOXYLATE) (PTF) AND ARTICLES MADE THEREFROM

CROSS-REFERENCE TO RELATED APPLICATIONS

This application claims the benefit of U.S. Provisional Application Nos. 61/918,728 filed on Dec. 20, 2013 and 62/055,730 filed on Sep. 26, 2014, which are incorporated herein by reference in their entirety.

FIELD OF THE DISCLOSURE

This present disclosure relates in general to nucleated crystallization of poly(trimethylene furandicarboxylate) (PTF). In particular to compositions comprising PTF and one or more of a plasticizer, a nucleating agent, and a copolyester of PTF comprising a furandicarboxylic acid-poly(alkylene ether) glycol (Furan-PAEG) soft segment and a PTF hard segment.

BACKGROUND INFORMATION 2,5-furandicarboxylic acid (FDCA) is a bioderived monomer that when utilized in polyester resins provides a rigid monomer motif similar to terephthalic acid (TPA). Resulting furan-based polyesters typically have DSC measured melting points about 40-50° C. below the corresponding terephthalic acid counterpart, for example while the melting point of poly(trimethylene terephthalate) (PTT) is about 229° C., the melting point of poly(trimethylene-2,5 furandicarboxylate) (PTF) is about 179° C. Furthermore, while PTT demonstrates a melting point at about 229° C. at 10° C./min heating rate as measured by differential scanning calorimeter (DSC), PTF shows nearly no melting at 10° C./min heating rate, indicative of a reduced ability to crystallize at this heating rate of 10° C./min. However, upon decreasing the heating/cooling rate from 10° C./min to 5° C./min and further to 1° C./min, the DSC scans of PTF shows a developing melting endotherm at about 175-179° C. ($\Delta H_m$ is less than 1 at 10° C./min; about 6.3 J/g at 5° C./min; and about 42 J/g at 1° C./min), thereby indicating that the ability of PTF to crystallize is inversely proportional to the heating rate. However, little is known regarding increasing crystallization rate of PTF by nucleated crystallization.

Hence, there is a need for new compositions comprising PTF with improved rate of crystallization.

SUMMARY OF THE DISCLOSURE

In a first embodiment, there is a composition comprising:
a) 90-99.9 wt % of polytrimethylene-2,5-furandicarboxylate (PTF); and
b) 0.1-10 wt % of a neutralized carboxylic acid salt or trisodium phosphate as a nucleating agent,
wherein the amounts are based on the total weight of the composition.

In a second embodiment, there is an article comprising the composition disclosed hereinabove, wherein the article is in the form of a sheet, a film or a molded article.

In a third embodiment, there is a composition comprising:
a) 80-99 wt % of poly(trimethylene-2,5-furandicarboxylate); and
b) 1-20 wt % of a plasticizer of the formula:

where
k is an integer from 1 to 3,
j is an integer from 4 to 25,
A and B are each independently selected from an alkyl group, an acyl group, or an aroyl group, each containing 1 to 10 carbon atoms,
X is H, $CH_3$ or $C_2H_5$,
wherein the amounts are based on the total weight of the composition.

In a fourth embodiment, the composition disclosed hereinabove further comprises 0.1-10 wt % of a neutralized carboxylic acid salt or trisodium phosphate as a nucleating agent, wherein the amounts are based on the total weight of the composition.

In a fifth embodiment, there is an article comprising the composition disclosed hereinabove, wherein the article is in the form of a sheet, a film or a molded article.

In a sixth embodiment, there is a composition comprising
a) 5-99 wt % of a copolyester comprising:
  i. a Furan-PAEG soft segment derived from at least one poly(alkylene ether) glycol (PAEG) and furan 2,5-dicarboxylic acid or a functional equivalent thereof, wherein the poly(alkylene ether) glycol comprises unsubstituted and methyl-substituted C2 to C10 aliphatic repeat units, and
  ii. a poly(trimethylene furandicarboxylate) hard segment derived from 1,3 propanediol and furan 2,5-dicarboxylic acid or a functional equivalent thereof; and
b) one or more of the following:
  i. 20-99 wt % of poly(trimethylene-2,5-furandicarboxylate),
  ii. 0.1-10 wt % of a neutralized carboxylic acid salt or trisodium phosphate as a nucleating agent, and
  iii. 0.1-20 wt % of a plasticizer having the formula:

where k is an integer from 1 to 3,
j is an integer from 4 to 25,
A and B are each independently selected from an alkyl group,
an acyl group, or an aroyl group, each containing 1 to 10 carbon atoms,
X is H, $CH_3$ or $C_2H_5$,
wherein the amounts in wt % are based on the total weight of the composition.

In a seventh embodiment, the copolyester comprises 1.5 to 45 wt % of Furan-PAEG soft segment.

In an eighth embodiment, the poly(alkylene ether) glycol is selected from the group consisting of poly(ethylene ether) glycol, poly(1,2-propylene ether) glycol, poly(trimethylene ether) glycol, poly(tetramethylene ether) glycol (polytetrahydrofuran), poly(pentamethylene ether) glycol, poly(hexamethylene ether) glycol, poly(heptamethylene ether) glycol, and poly(ethylene glycol)-block-poly(propylene glycol)-block-poly(ethylene glycol).

In a ninth embodiment, the copolyester is derived from 2,5 furandicarboxylic acid, 1,3 propanediol and polytrimethylene ether glycol (PTMEG) and whereby the copolyester has the following general structure:

PTF Hard Segment   Furan-PTMEG Soft Segment wherein n=50-99.5 wt %; r=0.5-50 wt %; and m=45-97 wt % relative to r.

In a tenth embodiment, there is an article comprising the composition of disclosed hereinabove, wherein the article is in the form of a sheet, a film or a molded article.

In an eleventh embodiment, there is a method of increasing crystallization rate in a poly(trimethylene-2,5-furandicarboxylate) (PTF) based polymer comprising blending and reacting poly(alkylene ether) glycol (PAEG) with poly(trimethylene furandicarboxylate) via melt mixing at a temperature of at least 200° C., wherein the resulting PTF based polymer is a copolyester comprising a Furan-PTMEG soft segment and a PTF hard segment.

In a twelfth embodiment, there is a method of increasing crystallization rate in a poly(trimethylene-2,5-furandicarboxylate) (PTF) based polymer comprising adding one or more of the following to the PTF based polymer:
a) a copolyester of PTF with poly(alkylene ether) glycol, wherein the poly(alkylene ether) glycol comprises unsubstituted and methyl-substituted C2-C10 aliphatic repeat units;
b) a neutralized carboxylic acid salt or trisodium phosphate; and
c) a plasticizer of the formula:

A-O—[CHX—(CH$_2$)$_k$—O]$_j$—B where
k is an integer from 1 to 3,
j is an integer from 4 to 25,
A and B are each independently selected from an alkyl group, an acyl group, or an aroyl group, each containing 1 to 10 carbon atoms,
X is H, CH$_3$ or C$_2$H$_5$.

BRIEF DESCRIPTION OF THE DRAWINGS

The present disclosure is illustrated by way of example and not limited to the accompanying figures.

DETAILED DESCRIPTION

The disclosures of all patent and non-patent literature referenced herein are hereby incorporated in their entireties.

The term "furandicarboxylic acid" is used interchangeably with furandicarboxylic acid; 2,5-furandicarboxylic acid; 2,4-furandicarboxylic acid; 3,4-furandicarboxylic acid; and 2,3-furandicarboxylic acid. As used herein, the 2,5-furandicarboxylic acid (FDCA), is also known as dehydromucic acid, and is an oxidized furan derivative, as shown below:

The term "furan 2,5-dicarboxylic acid (FDCA) or a functional equivalent thereof" refers to any suitable isomer of furandicarboxylic acid or derivative thereof such as, 2,5-furandicarboxylic acid; 2,4-furandicarboxylic acid; 3,4-furandicarboxylic acid; 2,3-furandicarboxylic acid or their derivatives. The terms "PTF" and "poly(trimethylene furandicarboxylate)" are used interchangeably to refer to poly(trimethylene-2,5 furandicarboxylate), poly(trimethylene-2,4 furandicarboxylate), poly(trimethylene-2,3 furandicarboxylate), and poly(trimethylene-3,4 furandicarboxylate).

The terms "copolyester", "copolyester of PTF", "PTF copolyester", "copolyester of PTF with poly(alkylene ether) glycol (PAEG)", "copolyester with PAEG", "PTF copolyetherester" are used interchangeably to refer to the copolyester composition of the present disclosure, comprising a PTF hard segment and a Furan-PAEG. Hence, "copolyester of PTF with PTMEG" is used interchangeably with "copolyester with PTMEG", and refers to a copolyester comprising a Furan-PTMEG soft segment and a PTF hard segment.

The terms "PTF based polymer", "copolyester of PTF", and "copolymers of PTF" refers to polymers comprising "trimethylene dicarboxylate" as at least one of the repeating unit.

The term "biologically-derived" is used interchangeably with "bio-derived" and refers to chemical compounds including monomers and polymers that are obtained from renewable resources such as plants and contain either only or substantially renewable carbon, and no or very minimal amount of fossil fuel-based or petroleum-based carbon. In an embodiment, 1,3 propanediol as used herein is bio-derived.

The phrase "increase in crystallization rate in a polymer" is used interchangeably to refer to the "increase in crystallinity" or "increase in the degree of crystallinity" of the polymer and also "improvement in the ability of the polymer to crystallize from glass or melt".

Compositions Comprising PTF and a Nucleating Agent and/or a Plasticizer

Disclosed herein is a composition comprising poly(trimethylene-2,5-furandicarboxylate) (PTF) and at least one of a nucleating agent such as a neutralized carboxylic acid salt or trisodium phosphate or a plasticizer such as poly(alkylene ether) glycol.

The neutralized carboxylic acid can be a C2-C30 aliphatic carboxylic acid, an aromatic carboxylic acid or a polymeric salt. The neutralized salt may be a metal salt such as sodium or potassium salts of the carboxylic acid or an organic salt. The nucleating agent may be added in sufficient quantity to provide a concentration of metal salt in the polymers that is at least 0.01 weight percent. The nucleating agent may alternatively be added in sufficient quantity to provide a concentration of metal salt in the polymers that is at least 0.1 weight percent.

Suitable examples of neutralized carboxylic acid salts include, but are not limited to, sodium acetate, potassium acetate, sodium benzoate, sodium benzoate, sodium montanate, and the metal salt of a copolymer of ethylene and methacrylic acid, wherein a portion of the carboxylic acid groups are neutralized with a metal, preferably sodium or potassium. The carboxylic acid of the copolymer is preferably at least 30% neutralized with metal and may contain additional comonomers, for example n-butyl acrylate. This neutralized copolymer is known as an "ionomer" and some varieties of ionomer are sold under the brand name, Surlyn®.

Neutralized carboxylic acid salts can also be prepared by neutralizing the carboxylic acid end-groups of PTF with metal, preferably sodium or potassium, and these salts can also be used as nucleating agents.

The neutralized carboxylic acid salt may be admixed with PTF in various ways in an amount in the range of 0.1-10 wt %, or 0.5-5 wt % or 0.75-2 wt %, based on the total weight of the composition. It can be added at any time during the synthesis of polyester, which in general is carried out by the esterification/transesterification followed by polycondensation process. It is also possible to mix mono-sodium terephthalate with granular PTF polymer followed by processing in an extruder. The neutralized carboxylic acid salt may be added as a pure compound or as a masterbatch, in the same or different polyester to which it is being added. The composition comprising PTF and a neutralized carboxylic acid salt or trisodium phosphate exhibits improvement in physical properties by increasing the crystallization rate and increasing the crystallinity, as compared to a nascent PTF with no nucleating agent.

In an aspect, there is a composition comprising:
a) 80-99 wt % or 80-95 wt % of poly(trimethylene-2,5-furandicarboxylate); and
b) 1-20 wt % or 1-10 wt % of a plasticizer of the formula:

A—O—[CHX—(CH$_2$)$_k$—O]$_j$—B where
k is an integer from 1 to 3,
j is an integer from 4 to 25,
A and B are each independently selected from an alkyl group, an acyl group, or an aroyl group, each containing 1 to 10 carbon atoms,
X is H, CH$_3$ or C$_2$H$_5$,
wherein the amounts are based on the total weight of the composition.

In an embodiment, the plasticizer is a poly(alkylene ether) glycol, optionally bearing CH$_3$O or CH$_3$CH$_2$O or acyl or aroyl end-groups on either or both ends of the polyether. Exemplary acyl end-group containing 1 to 10 carbon atoms includes, but is not limited to 2-ethylhexanoate. Exemplary alkyl end-group containing 1 to 10 carbon atoms includes, but is not limited to methyl and ethyl. Exemplary aroyl end-group includes, but is not limited to benzoyl and nonylbenzoyl.

The plasticizer can be poly(tetramethylene ether) glycol (PTMEG) or polyethylene glycol, optionally bearing CH$_3$O or CH$_3$CH2O or acyl or aroyl end-groups on either or both ends of the polyether.

The composition comprising PTF and a plasticizer can further comprise 0.1-10 wt % or 0.5-10 wt % of a neutralized carboxylic acid salt or trisodium phosphate as a nucleating agent.

The compositions comprising PTF and one or more of a nucleating agent and a plasticizer, as described hereinabove may comprise other components such as, softeners, dyes, pigments, antioxidants, stabilizers, ultraviolet stabilizers, flame retardants, mold release agents, fillers and the like. The compositions of this present disclosure can optionally be filled with between 10 and 60 weight percent of a filler as a reinforcing or filling material. In an embodiment, the composition comprises one or more fillers selected from the group consisting of glass fibers, glass beads, aramid fibers, aluminum silicate, carbon fibers, mica, calcium carbonate, and combinations thereof.

The compositions as described hereinabove may also contain elastomeric tougheners, such as polymers made from ethylene, n-butyl acrylate, and glycidyl methacrylate.

The compositions comprising PTF and one or more of a nucleating agent and a plasticizer, as disclosed hereinabove can have a recrystallization temperature (T$_{cc}$) from glass of in the range of 85-140° C., or 90-140° C., or 96-140° C., or 100-140° C., or 105-140° C., or 110-140° C., or 115-140° C., or 120-140° C., or 125-140° C., or 130-140° C., or 135-140° C.

Compositions Comprising a Copolyester of PTF

Disclosed herein is a composition comprising PTF and one or more of a copolyester, a neutralized carboxylic acid salt or trisodium phosphate as a nucleating agent, and a plasticizer, wherein the copolyester comprises a Furan-Poly (alkylene ether) glycol (Furan-PAEG) soft segment and a poly(trimethylene furandicarboxylate) (PTF) hard segment.

The copolyester is derived from polymerizing 1,3 propanediol, furan 2,5-dicarboxylic acid or a functional equivalent thereof, and at least one poly(alkylene ether) glycol (PAEG) The Furan-PAEG soft segment of the copolyester is derived from at least one poly(alkylene ether) glycol (PAEG) and furan 2,5-dicarboxylic acid or a functional equivalent thereof, wherein the poly(alkylene ether) glycol comprises unsubstituted and methyl-substituted C2 to C10 aliphatic repeat units. The amount of Furan-PAEG soft segment present in the copolyester can be in the range of about 0.5-50 wt % or about 1.5-45 wt % or about 1.50-30 wt % or about 1.5-15 wt %, based on the total weight of the copolyester composition. The PTF hard segment of the copolyester is derived from 1,3 propanediol and furan 2,5-dicarboxylic acid or a functional equivalent thereof. The amount of PTF hard segment present in the copolyester can be in the range of about 50-99.5 wt % or about 45-98.5 wt % or about 70.0-98.5 wt % or about 85-98.5 wt %, based on the total weight of the copolyester composition. In terms of mol %, the amount of Furan-PAEG soft segment present in the copolyester is in the range of about 0.5-50 mol % or about 1.5-45 mol % or about 1.5-30 mol % or about 1.5-15 mol %, based on the total mole content of the Furan-PAEG soft segment(s) and PTF hard segment(s) in the copolyester.

The copolyester, as disclosed herein can have a number average molecular weight in the range of 10000-35000 or 10000-30000 or 10000-25000, as measured by size exclusion chromatography. Furthermore, the copolyester, as disclosed herein, can have an intrinsic viscosity (IV) in the range of 0.5-1.5 or 0.5-1.2 or 0.5-1.

Poly(alkylene ether) glycol (PAEG) for use in the embodiments disclosed herein are based on unsubstituted and methyl-substituted aliphatic repeat units containing 2 to 10 carbon atoms and generally have a molecular weight in the range of about 100 daltons to about 4000 daltons. Exemplary poly(alkylene ether) glycols include, but are not limited to poly(ethylene ether) glycol, poly(1,2-propylene ether) glycol, poly(trimethylene ether) glycol, poly(tetramethylene ether) glycol (polytetrahydrofuran), poly(pentamethylene ether) glycol, poly(hexamethylene ether) glycol, poly(heptamethylene ether) glycol, and poly(ethylene glycol)-block-poly(propylene glycol)-block-poly(ethylene glycol). Preferably, the poly(alkylene ether) glycol is derived from a renewable biological source, in particular poly(trimethylene ether) glycol and poly(tetramethylene ether) glycol (PTMEG].

In an embodiment, the poly(alkylene ether) glycol is poly(tetramethylene ether) glycol (PTMEG) and whereby the copolyester comprises a Furan-PTMEG soft segment and a PTF hard segment and has the following general structure:

PTF Hard Segment      Furan-PTMEG Soft Segment wherein n=50-99.5 wt % or 45-98.5 wt % or 70-98.5 wt % or 85-98.5 wt %;
r=0.5-50 wt % or 1.5-45 wt % or 1.50-30 wt % or 1.5-15 wt %; and
m=45-97 wt % or 50-95 wt % or 89-92 wt % relative to r.

In another embodiment, the poly(alkylene ether) glycol is polyethylene glycol (PEG) and whereby the copolyester comprises a Furan-PEG soft segment and a PTF hard segment.

The copolyesters as disclosed herein, comprising a PTF hard segment and a Furan-PAEG soft segment exhibits improvement in physical properties by improvement in the crystallization rate and also crystallinity, as compared to PTF polymer with only hard segment and no soft segment when PTF and the copolyester are measured at the same heating rate.

Figure 1:
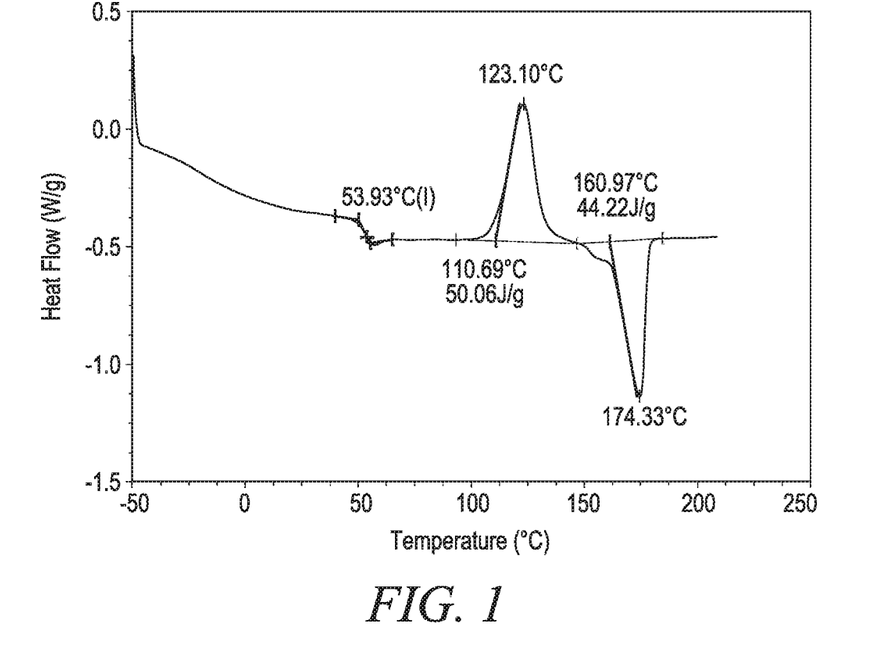
FIG. 1 is a Differential Scanning calorimeter (DSC) plot ($2^{nd}$ heating, 10°/min) showing Heat flow versus Temperature for copolyester of PTF with 1 wt % Furan-PTMEG soft segment as in Example 1.5.
Figure 2:
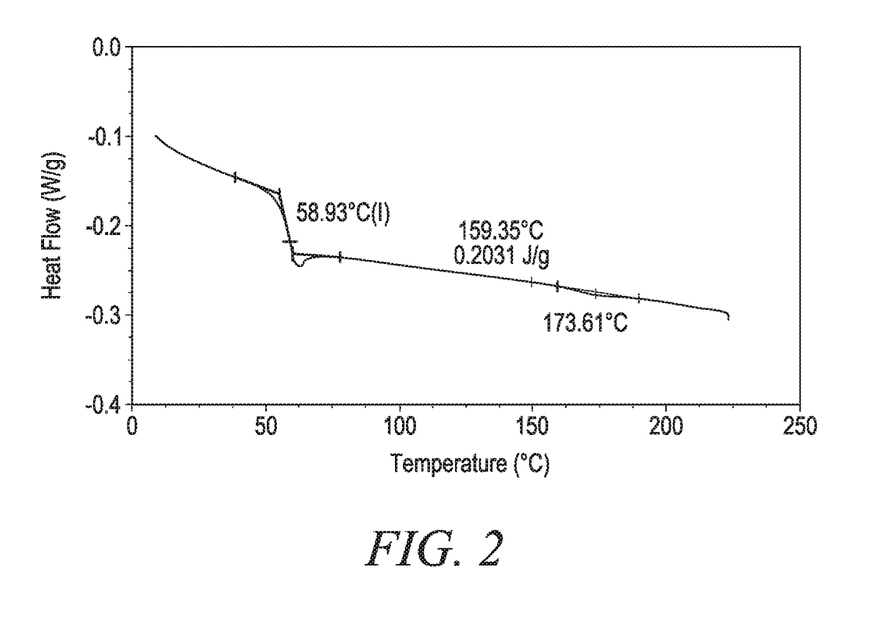
FIG. 2 is a DSC plot ($2^{nd}$ heating, 10°/min) showing Heat flow versus Temperature for PTF as in Control A.

FIGS. 1 and 2 illustrate the improvement in crystalline properties of the PTF-based polymer comprising a Furan-PAEG soft segment (copolyester film) of the present disclosure as compared to PTF film without a soft segment. FIGS. 1 and 2 are differential scanning calorimeter (DSC) plots showing heat flow vs temperature for a copolyester film comprising 1 wt % Furan-PTMEG soft segment, as disclosed below in Example 1.5 and for a poly(trimethylene furandicarboxylate) (PTF) film comprising no soft segment, as disclosed below in the Control A respectively. The DSC scan of PTF as shown in FIG. 2 shows a very weak melting endotherm ($\Delta H_m$=0.2031 J/g) at about 174° C., whereas the DSC scan of copolyester film comprising 1 wt % Furan-PTMEG soft segment, as shown in FIG. 1 shows a melting endotherm ($\Delta H_m$=44.2 J/g) at about 174° C. and a recrystallization from glass at about 123° C. ($\Delta H_{cc}$=50.06 J/g). The much larger enthalphy of melting ($\Delta H_m$=44.2 J/g) of the copolyester as compared to that of PTF ($\Delta H_m$=0.2031 J/g) indicates that PTF has much smaller degree of crystallinity and is harder to crystallize as compared to the copolyester when evaluated at the same heating rate. Hence, the DSC scans demonstrates that the presence of even a small amount of soft segment in PTF, such as 1 wt % of Furan-PTMEG soft segment can improve crystallinity and increase the ability of the films comprising a minor amount of Furan-PTMEG soft segment and a major amount of PTF hard segment to readily crystallize from the glass.

The copolyesters as disclosed hereinabove can have a recrystallization temperature ($T_{cc}$) from glass in the range of 85-140° C., or 90-140° C., or 96-140° C., or 100-140° C., or 105-140° C., or 110-140° C., or 115-140° C., or 120-140° C., or 125-140° C., or 130-140° C., or 135-140° C.

In another embodiment, the copolyesters as disclosed hereinabove can have an enthalpy of melting in the range of 5-50 J/g or 10-45 J/g, or 10-40 J/g, after recrystallization at 115° C. for 6 hours.

The as-produced copolyesters as disclosed hereinabove can have a crystallinity index in the range of 0-75 or 10-60 or 15-50, as measured from WAXS described hereinbelow. The copolyesters as disclosed hereinabove after recrystallization at 115° C. for 6 hours can have a crystallinity index in the range of 10-75 or 15-60 or 20-50 as measured from WAXS, described herein below.

Although not to be bound by any theory, it is believed that the copolyester compositions disclosed herein, comprising a Furan-PTMEG soft segment and a PTF hard segment will also exhibit improvement in brittleness, heat resistance, and impact resistance over a polyester composition comprising only PTF hard segment.

In an aspect, there is a composition comprising the copolyester, as disclosed hereinabove, and one or more of the following:
a) about 20-99 wt % or about 20-80 wt % or about 30-70 wt % of poly(trimethylene-2,5-furandicarboxylate);
b) about 0.1-10 wt % or about 0.5-10 wt % of a neutralized carboxylic acid salt or trisodium phosphate as a nucleating agent; and
c) about 0.1-20 wt % or about 0.5-15 wt % or about 1-10 wt % of a plasticizer having the formula:

where
k is an integer from 1 to 3,
j is an integer from 4 to 25,
A and B are each independently selected from an alkyl group, an acyl group, or an aroyl group, each containing 1 to 10 carbon atoms,
X is H, $CH_3$ or $C_2H_5$, and
wherein the amounts in wt % are based on the total weight of the composition.

The amount of copolyester present in the composition can be in the range of about 5-99 wt % or about 20-80 wt % or about 30-70 wt %, based on the total weight of the composition.

The composition disclosed herein can comprise one or more of the following combination of ingredients:
- a copolyester blended with a plasticizer;
- a copolyester blended with a neutralized carboxylic acid salt or trisodium phosphate as a nucleating agent;
- a copolyester blended with a plasticizer and a neutralized carboxylic acid salt or trisodium phosphate as a nucleating agent;
- a copolyester blended with PTF;
- a copolyester blended with PTF and a neutralized carboxylic acid salt or trisodium phosphate as a nucleating agent;
- a copolyester blended with PTF and a plasticizer
- a copolyester blended with PTF, a plasticizer and a neutralized carboxylic acid salt or trisodium phosphate as a nucleating agent.

In an aspect, there is a method of increasing the crystallization rate in poly(trimethylene-2,5-furandicarboxylate) (PTF) based polymers and/or improving the ability of PTF based polymers to crystallize from glass comprising blending and reacting poly(alkylene ether) glycol (PAEG) with poly(trimethylene furandicarboxylate) via melt mixing at a temperature of at least 200° C., wherein the resulting PTF based polymer is a copolyester comprising a Furan-PTMEG soft segment and a PTF hard segment. Any suitable amount of PAEG may be added that is sufficient to show an improvement in the crystallization rate of PTF based polymers &/or an improvement in the ability of PTF based polymers to crystallize from glass. PAEG may be added in the range of about 0.5-50 wt % or about 1.5-45 wt % or about 1.50-30 wt % or about 1.5-15 wt %, based on the total weight of the composition. In an embodiment, the method further comprises adding at least one of a nucleating agent such as a neutralized carboxylic acid salt or trisodium phosphate or a plasticizer that is a poly(alkylene ether) glycol or its derivatives, as disclosed herein above.

In an aspect, there is a method of increasing crystallization rate in (poly(trimethylene-2,5-furandicarboxylate) (PTF) based polymers and/or improving the ability of PTF based polymers to crystallize from glass comprising adding one or more of a copolyester of PTF with PAEG, a neutralized carboxylic acid salt or trisodium phosphate, and a plasticizer, to the PTF based polymers.

The increase in crystallization rate of the PTF based polymers is reflected in the improvement in the ability of PTF based polymers to crystallize from glass and also from melt, as evidenced by the increase in the magnitude of at least one of the enthalpy of recrystallization from glass (or cold crystallization) ($\Delta H_{cc}$) or the enthalpy of melting ($\Delta H_m$), measured using differential scanning calorimetry (DSC), as described hereinbelow.

The compositions comprising a copolyester and one or more of PTF, a nucleating agent and a plasticizer, as described hereinabove may contain other components such as, softeners, dyes, pigments, antioxidants, stabilizers, ultraviolet stabilizers, flame retardants, mold release agents, fillers and the like. The compositions of this disclosure can optionally be filled with between 10 and 60 wt percent of a filler as a reinforcing or filling material. In an embodiment, the composition comprises one or more fillers selected from the group consisting of glass fibers, glass beads, aramid fibers, aluminum silicate, carbon fibers, mica, calcium carbonate, and combinations thereof.

The compositions as described hereinabove may also contain elastomeric tougheners, such as polymers made from ethylene, n-butyl acrylate, and glycidyl methacrylate.

The compositions comprising a copolyester and one or more of PTF, a nucleating agent and a plasticizer, as disclosed hereinabove can have a recrystallization temperature ($T_{cc}$) from glass of in the range of 85-140° C., or 90-140° C., or 96-140° C., or 100-140° C., or 105-140° C., or 110-140° C., or 115-140° C., or 120-140° C., or 125-140° C., or 130-140° C., or 135-140° C.

Articles

The compositions as described hereinabove are of value in all forms of application where currently PET and similar polyesters are used.

In an embodiment, there is a thermoplastic molding composition comprising a copolyester and one or more of PTF, a nucleating agent and a plasticizer, as disclosed hereinabove. In another embodiment, there is an article comprising the composition, as disclosed hereinabove, comprising a copolyester and one or more of PTF, a nucleating agent and a plasticizer, as disclosed hereinabove.

In an embodiment, there is a thermoplastic molding composition comprising PTF and one or more of a nucleating agent and a plasticizer, as disclosed hereinabove. In another embodiment, there is an article comprising the composition, as disclosed hereinabove comprising PTF and one or more of a nucleating agent and a plasticizer.

In an embodiment, the article is in the form of a fiber, a sheet, a film or a molded article. In an embodiment, the article is in the form of a sheet, a film or a molded article. In another embodiment, the article is in any form excluding fiber. The article can be in the form of a film, a sheet, a coating, a shaped article, a container, a bottle, housing, or a layer in a multi-layer laminate, for example a shrink-wrap film. A film herein can be oriented or not oriented, or uniaxially oriented or biaxially oriented.

The difference between a sheet and a film is the thickness, but as the thickness of an article will vary according to the needs of its application, it is difficult to set a standard thickness that differentiates a film from a sheet. Nevertheless, a sheet will be defined herein as having a thickness greater than about 0.25 mm (10 mils). Preferably, the thickness of the sheets herein are from about 0.25 mm to about 25 mm, more preferably from about 2 mm to about 15 mm, and even more preferably from about 3 mm to about 10 mm. In a preferred embodiment, the sheets hereof have a thickness sufficient to cause the sheet to be rigid, which generally occurs at about 0.50 mm and greater. However, sheets thicker than 25 mm, and thinner than 0.25 mm may be formed. Correspondingly, films as formed from the polymers hereof will in almost all cases have a thickness that is less than about 0.25 mm.

Films and sheets may be formed by any process known in the art, such as extrusion, compression, solution casting, dipcoating, injection molding, lamination, blown film, extrusion coating, and tandem extrusion coating. The films or sheets may be formed by melt extrusion, melt coextrusion, melt extrusion coating, blown film, or by a tandem melt extrusion coating process. The parameters for each of these processes will be determined by the viscosity characteristics of the copolyester composition or the composition and the desired thickness of the article. Containers may also be made using blow, injection, injection stretch blow, extrusion blow molding in either 1-2 steps.

The film or sheet hereof may be combined with other polymeric materials during extrusion and/or finishing to form laminates or multilayer sheets with improved characteristics. In particular, the polymeric film or sheet hereof may be combined with one or more of the following: polyethylene terephthalate (PET), polytrimethylene terephthalate (PTT), polybutylene terephthalate (PBT), polyethylene furandicarboxylate (PEF), polybutylene furandicarboxylate (PBF), aramid, polyethylene sulfide (PES), polyphenylene sulfide (PPS), polyimide (PI), polyethylene imine (PEI), polyethylene naphthalate (PEN), polysulfone (PS), polyether ether ketone (PEEK), polyolefins, polyethylene, poly(cyclic olefins) and poly(cyclohexylene dimethylene terephthalate), for example. Other polymers which may be used in combination with the polyester polymer of the present disclosure are those listed in U.S. application Ser. Nos. 09/064,826 and 09/064,720. A multilayer or laminate sheet may be made by any method known in the art, and may have as many as five or more separate layers joined together by heat, adhesive and/or a tie layer, as known in the art.

The compositions described hereinabove, can be formed into films or sheets directly from the polymerization melt. In the alternative, the compositions may be formed into an easily handled shape (such as pellets) from the melt, which may then be used to form a film or sheet. Sheets can be used, for example, for forming signs, glazings (such as in bus stop shelters, sky lights or recreational vehicles), displays, automobile lights and in thermoforming articles.

Alternatively, the articles comprising the compositions described herein are molded articles, which may be prepared by any conventional molding process, such as, compression molding, injection molding, extrusion molding, blow molding, injection blow molding, injection stretch blow molding, extrusion blow molding and the like. Articles may also be formed by combinations of two or more of these processes, such as for example when a core formed by compression molding is overmolded by injection molding.

In particular, the compositions, as described herein above are suitable for manufacturing:

Fibers for apparel or flooring applications
mono- and bi-oriented films, and films multilayered with other polymers;
cling or shrink films for use with foodstuffs;
thermoformed foodstuff packaging or containers, both mono- and multi-layered, as in containers for milk, yogurt, meats, beverages and the like;
coatings obtained using the extrusion coating or powder coating method on substrates comprising of metals not limited to such as stainless steel, carbon steel, aluminum, such coatings may include binders, agents to control flow such as silica, alumina
multilayer laminates with rigid or flexible backings such as for example paper, plastic, aluminum, or metallic films;
foamed or foamable beads for the production of pieces obtained by sintering;
foamed and semi-foamed products, including foamed blocks formed using pre-expanded articles; and
foamed sheets, thermoformed foam sheets, and containers obtained from them for use in foodstuff packaging.

Method of Preparation of a Copolyester Comprising Furan-PTMEG Soft Segment and a PTF Hard Segment The copolyester as disclosed hereinabove can be prepared from 1,3 propanediol (PDO); from 2,5-furandicarboxylic acid (FDCA) or a derivative thereof; and from poly(alkylene ether) glycol (PAEG), such as poly(tetramethyleneglycol) (PTMEG). In a derivative of 2,5-furancarboxylic acid, the hydrogens at the 3 and/or 4 position on the furan ring can, if desired, be replaced, independently of each other, with —$CH_3$, —$C_2H_5$, or a $C_3$ to $C_{25}$ straight-chain, branched or cyclic alkane group, optionally containing one to three heteroatoms selected from the group consisting of O, N, Si and S, and also optionally substituted with at least one member selected from the group consisting of —Cl, —Br, —F, —I, —OH, —$NH_2$ and —SH. A derivative of 2,5-furandicarboxylic acid can also be prepared by substitution of an ester or halide at the location of one or both of the acid moieties.

A copolyester can be made by a two-step process, wherein first a prepolymer is made from PDO, PAEG, and FDCA or a derivative thereof, resulting in an oligomer with a 2,5-furandicarboxylate moiety within the backbone. This intermediate product is preferably an ester composed of two diol monomers (PDO and PAEG) and one diacid monomer, wherein at least part of the diacid monomers comprises 2,5-FDCA, followed by a melt-polymerization of the prepolymers under suitable polymerization conditions. Such conditions typically involve reduced pressure to remove the excess of diol monomers. Esters of 2,5 furandicarboxylic acid or the diacid itself or mixtures of both may be used.

For instance, in step (I) dimethyl-2,5-furandicarboxylate is reacted in a catalyzed transesterification process with about 2 equivalents of a diol (PDO and PAEG), to generate the prepolymer while removing 2 equivalents of methanol. Dimethyl-2,5-furandicarboxylate is preferred, as this transesterification step generates methanol, a volatile alcohol that is easy to remove. However, as starting material, diesters of 2,5-furandicarboxylic acid with other volatile alcohols or phenols (e.g. having a boiling point at atmospheric pressure of less than 150° C., preferably less than 100° C., more preferably of less than 80° C.) may be used as well. Preferred examples therefore include ethanol, methanol and a mixture of ethanol and methanol. The aforementioned reaction leads to a polyester. Moreover, the diol monomers may if desired contain additional hydroxyl groups, such as glycerol, pentaerythritol or sugar alcohols. The furan diacid may also be used directly, or converted to the diester or can be added along with the diester.

Step (II) of this process is a catalyzed polycondensation step, wherein the prepolymer is polycondensed under reduced pressure, at an elevated temperature and in the presence of a suitable catalyst. In various embodiments of this process, the first step is a transesterification step, catalyzed by a specific transesterification catalyst at a temperature preferably in the range of from about 150 to about 260° C., more preferably in the range of from about 180 to about 240° C. and carried out until the starting ester content is reduced until it reaches the range of about 3 mol % to less than about 1 mol %. The selection of the transesterification catalyst is therefore effected by the selection of the catalyst used in the polycondensation step. Tyzor® organic titanates and zirconates catalysts such Tyzor® TPT, Tyzor® TBT can be used. Tin(IV) based catalysts, preferably organotin(IV) based catalysts such as alkyltin(IV) salts including monoalkyltin(IV) salts, dialkyl and trialkyltin(IV) salts and mixtures thereof, can also be used as transesterification catalysts, that are better than tin(II) based catalysts such as tin(II) octoate. These tin(IV) based catalysts may be used with alternative or additional transesterification catalysts. Antimony based catalysts can also be used.

Examples of alternative or additional transesterification catalysts that may be used in step 1 include one or more of titanium(IV) alkoxides or titanium(IV) chelates, zirconium (IV) chelates, or zirconium(IV) salts (e.g. alkoxides); hafnium(IV) chelates or hafnium(IV) salts (e.g. alkoxides). Other suitable transesterification catalysts are butyltin(IV)

tris(octoate), dibutyltin(IV) di(octoate), dibutyltin(IV) diacetate, dibutyltin(IV) laureate, bis(dibutylchlorotin(IV)) oxide, dibutyltin dichloride, tributyltin(IV) benzoate and dibutyltin oxide, antimony oxides. Other suitable organic transesterification catalysts include, but are not limited to 1,5,7-Triazabicyclo[4.4.0]dec-5-ene (TBD) and 1,8-diazabicyclo[5.4.0]undec-7-ene (DBU).

The active catalyst as present during the reaction may be different from the catalyst as added to the reaction mixture. The catalysts are used in an amount of about 0.01 mol % relative to initial diester to about 0.2 mol % relative to initial diester, more preferably in an amount of about 0.04 mol % of initial diester to about 0.16 mol % of initial diester.

The intermediate product is used as such in the subsequent polycondensation step. In this catalyzed polycondensation step, the prepolymer is polycondensed under reduced pressure, at an elevated temperature and in the presence of a suitable catalyst. The temperature is preferably in the range of about the melting point of the polymer to about 30° C. above this melting point, but preferably not less than about 180° C. The pressure should be reduced preferably gradually. It should preferably be reduced to as low as possible, more preferably below 1 mbar.

This second step is preferably catalyzed by a polycondensation catalyst such as one of those listed below, and the reaction is preferably carried out at mild melt conditions. Examples of suitable polycondensation catalysts include titanium(IV) alkoxides or titanium(IV) chelates, zirconium (IV) chelates, or zirconium(IV) salts (e.g. alkoxides); hafnium(IV) chelates or hafnium(IV) salts (e.g. alkoxides) tin(II) salts such as tin(II) oxide, tin(II) dioctoate, butyltin (II) octoate, or tin(II) oxalate. Other catalysts include tin(II) salts obtained by the reduction of the tin(IV) catalyst, e.g. alkyltin(IV), dialkyltin(IV), or trialkyltin(IV) salts, antimony based salts used as transesterification catalyst with a reducing compound. Additional catalyst can be added prior to the condensation reaction to increase reaction efficacy. Reducing compounds used may be well-known reducing compounds, preferably phosphorus compounds. Various suitable reducing compounds are organophosphorus compounds of trivalent phosphorus, in particular a monoalkyl or dialkyl phosphinate, a phosphonite or a phosphite. Examples of suitable phosphorus compounds are triphenyl phosphite, diphenyl alkyl phosphite, phenyl dialkyl phosphite, tris (nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, di(2,4-di-tert-butylphenyl)pentaerythritol diphosphite, tristearylsorbitol triphosphite, tetrakis(2,4-di-tert-butylphenyl) 4,4'-diphenylenediphosphonite, 4,4'-isopropylidenediphenol alkyl (C12-15) phosphite, poly(dipropylene glycol) phenyl phosphite, tetraphenyl dipropylene glycol phosphite, tetraphenyl diisopropylene glycol phosphite, trisisodecyl phosphite, diisodecyl-phenyl phosphite, diphenyl isodecyl phosphite, and mixtures of these.

In various embodiments, the catalysts therefore include Ti salts such as titanium(IV) alkoxides or titanium(IV) chelates and/or zirconium salts can be used along with reducing agents. Preferably, the reducing compound is added in the melt of the prepolymer. The addition of the reducing compound at this stage will sometimes avoid discoloration of the polymer product and increase molecular weight of the polymer. It is thus found that a combination of transesterification catalyst and polycondensation catalyst that is of particular interest is based on a tin(IV) type catalyst during transesterification, which is reduced, preferably with triphenylphosphite and/or tris(nonylphenyl)phosphite, to a tin(II) type catalyst during the polycondensation.

The catalysts are used in an amount of about 0.01 mol % relative to initial diester to about 0.2 mol % relative to initial diester, more preferably in an amount of about 0.04 mol % of initial diester, to about 0.16 mol % of initial diester.

In solid state polymerization (SSP) processes pellets, granules, chips or flakes of polymer are subjected for a certain amount of time to elevated temperatures (below melting point) in a hopper, a tumbling drier or a vertical tube reactor or the like. The presence of titanium based catalysts during SSP of the FDCA-based polymers has enabled the polymer to reach a number average molecular weight of 20,000 and greater. As compared to SSP as typically used to upgrade recycled PET, the temperature should be elevated but nonetheless remain (well) below the melting point of the polymer.

Method of Preparation of a Copolyester Comprising Furan-PTMEG Soft Segment and a PTF Hard Segment by Reactive Blending In an embodiment, there is a process of making a copolyester comprising Furan-PTMEG soft segment and a PTF hard segment comprising blending and reacting a polymer composition comprising poly(trimethylene furandicarboxylate) (PTF) and a poly(alkylene ether) glycol (PAEG) via melt mixing at a temperature of at least 200° C. Suitable processes include melt blending in a single screw extruder, a twin screw extruder, on a two roll mill, a screw feeding injection molding machine, or in an internal mixture such as a Banbury mixer. Preferably, an extruder is used to melt blend the ingredients to form the reactive blend composition. The process will be further described using the preferred extrusion process.

The polymer composition comprising PTF and PAEG are fed to the extruder in as is commercially available liquid or solid form (granulates or flakes). In an embodiment, the amount of PAEG to be fed is to provide a final soft segment content of 1-50 wt %. The mixing temperature of the melt in the extruder will be a temperature sufficient to melt the polymers such that they can be processed through an extruder. The exact temperature used will depend on the melt processing temperature of the highest melting point polymers used in the blend. Melt processing temperatures for a PTF/PAEG blend will be at least 200° C., as can be well understood by those skilled in the art of polymer blending. The polymer components are in the extruder for a very short time such as from about 5 seconds to about five minutes. The reaction does not need to be completed within the extruder, as it will continue after exiting the extruder.

The copolyester formed by reactive blending, comprising Furan-PTMEG soft segment and a PTF hard segment have many uses. Articles may be extruded into various profiles and shapes such as sheet, film, pipe, and other shaped articles. The compositions may be molded by injection molding, transfer molding or compression molding. The compositions may be calendered into sheet and film using conventional calendering equipment.

Method of Preparation of Compositions Disclosed Hereinabove

The compositions disclosed hereinabove can be prepared by melt-blending in melt-mixing equipment. Suitable melt-mixing equipment includes, but is not limited to, twin-screw extruders, single-screw extruders, Farrell mixers, microcompounders (for example the DSM microcompounder), Haake mixers, and the Brabender PlastiCorder® from Brabender Instruments, Hackensack, N.J. The PlastiCorder® consists of a heated chamber composed of two or three parts that can be separated to open the chamber and remove the material that is being mixed therein. The chamber contains two rotating blades that are driven by a high-powered motor. In the PlastiCorder®, the ingredients are typically added one at a time through the chute at the top of a heated chamber, and torque is monitored to ensure that the solid material is not being added too rapidly to stall out the motor. Heating temperature and blade rotation can be controlled. Inert gas, for example nitrogen, can be introduced through the chute to maintain a fairly inert atmosphere.

The copolyester can be prepared by polymerizing propane diol. 2,5-furandicarboxylic acid dimethyl ester, poly(tetramethylene ether) glycol, optional trimethyl trimellitate, and Irganox® antioxidants, with titanium tetraalkoxide catalyst, in the absence of solvent. The polymerization starts at room temperature and takes place largely at 230-250° C.

The compositions comprising PTF and a copolyester can be prepared by adding pieces or pellets of each polymer sequentially to the PlastiCorder®. A mixture of pellets or pieces of the two polymers can alternatively be introduced to the PlastiCorder®. The total charge of ingredients is about 40-50 g. The PlastiCorder® mixing chamber temperature is maintained at about 200-230° C. and the blade rotation set at 50-100 rpm, most preferably 75 rpm. The polymers are introduced to the chamber in about 1 minute and mixing takes place for about 5-30 minutes, typically 5-20 minutes. The mixture can be ejected from the top chute of the PlastiCorder® by reversing the blade rotation. More of the polymer is scraped out of the chamber when it is disassembled and scraped off the walls mainly while still in the molten state.

The composition comprising PTF and a plasticizer can be prepared by feeding the PTF into the PlastiCorder® and then the plasticizer. Mixing takes place under approximately the same conditions as for PTF and copolyester. The ingredients total about 40-50 g and the PTF concentration is about 10-20 times that of the plasticizer. The polymer composition is removed in the same manner as described above.

The composition comprising a copolyester and a plasticizer can be prepared by mixing in the same manner and the same ratios as the PTF and plasticizer.

The composition comprising PTF, a copolyester, and a plasticizer can be prepared by mixing and removing in the same manner as the PTF and plasticizer. PTF and the copolyester can be added sequentially to the PlastiCorder®. Alternatively, the pieces or pellets of PTF and copolyester can be tumble-mixed and the mixture added to the PlastiCorder®. Then, the plasticizer is added.

The composition comprising PTF, a copolyester, and a nucleating agent can be prepared by adding pieces of pellets of each polymer sequentially to the PlastiCorder®. A mixture of pellets or pieces of the two polymers can alternatively be introduced to the PlastiCorder®. The nucleating agent can be added after the polymers or together with them. The PlastiCorder® mixing chamber temperature is maintained at about 200-230° C. and the blade rotation set at 50-100 rpm, most preferably 75 rpm. The polymers are introduced to the chamber in about 1 minute and mixing takes place for about 5-30 minutes, typically 5-20 minutes. The total charge of ingredients weighs about 40-50 g, and the ratio of PTF and copolyester is about 50:50. The mixture can be ejected from the top chute of the PlastiCorder® by reversing the blade rotation. More of the polymer is scraped out of the chamber when it is disassembled and scraped of the walls mainly while still in the molten state.

The composition comprising PTF, a plasticizer, and a nucleating agent can be prepared by feeding the PTF into the PlastiCorder® and then the plasticizer and nucleating agent. The plasticizer and nucleating agent can be added in either order. The nucleating agent can be added after the polymer or together with it. Mixing takes place under approximately the same conditions as for PTF and copolyester. The plasticizer is polyethylene glycol or polytetramethylene glycol or derivative. The polymer composition is removed in the same manner.

The composition comprising a copolyester, a plasticizer, and a nucleating agent can be prepared in the same manner as the composition containing PTF, plasticizer, and nucleating agent, substituting the copolyester for the PTF.

The composition comprising PTF, a copolyester, a plasticizer, and a nucleating agent can be prepared by mixing and removing in the same manner as the composition containing PTF, plasticizer, and nucleating agent.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used herein, the phrase "one or more" is intended to cover a non-exclusive inclusion. For example, one or more of A, B, and C implies any one of the following: A alone, B alone, C alone, a combination of A and B, a combination of B and C, a combination of A and C, or a combination of A, B, and C.

In the foregoing specification, the concepts have been disclosed with reference to specific embodiments. However, one of ordinary skill in the art appreciates that various modifications and changes can be made without departing from the scope of the present disclosure as set forth in the claims below.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all embodiments.

It is to be appreciated that certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges include each and every value within that range.

The concepts disclosed herein will be further described in the following examples, which do not limit the scope of the present teachings described in the claims.

The examples cited here relate to copolyesters, compositions comprising copolyester and one or more of a nucleating agent, a plasticizer or PTF.

EXAMPLES

Test Methods

Molecular Weight by Size Exclusion Chromatography

A size exclusion chromatography system, Alliance 2695™ (Waters Corporation, Milford, Mass.), was provided with a Waters 414™ differential refractive index detector, a multi-angle light scattering photometer DAWN Heleos II (Wyatt Technologies, Santa Barbara, Calif.), and a Visco-Star™ differential capillary viscometer detector (Wyatt). The software for data acquisition and reduction was Astra® version 5.4 by Wyatt. The columns used were two Shodex GPC HFIP-806M™ styrene-divinyl benzene columns with an exclusion limit of $2 \times 10^7$ and 8,000/30 cm theoretical plates; and one Shodex GPC HFIP-804M™ styrene-divinyl benzene column with an exclusion limit $2 \times 10^5$ and 10,000/30 cm theoretical plates.

The specimen was dissolved in 1,1,1,3,3,3-hexafluoro-2-propanol (HFIP) containing 0.01 M sodium trifluoroacetate by mixing at 50° C. with moderate agitation for four hours followed by filtration through a 0.45 µm PTFE filter. Concentration of the solution was circa 2 mg/mL.

Data was taken with the chromatograph set at 35° C., with a flow rate of 0.5 ml/min. The injection volume was 100 µl. The run time was 80 min. Data reduction was performed incorporating data from all three detectors described above. Eight scattering angles were employed with the light scattering detector. No standard for column calibration was involved in the data processing.

Molecular Weight by Intrinsic Viscosity

Intrinsic viscosity (IV) was determined using the Goodyear R-103B Equivalent IV method, using T-3, Selar® X250, Sorona® 64 as calibration standards on a Viscotek® Forced Flow Viscometer Model Y-501C. Methylene chloride/trifluoro acetic acid was the solvent carrier.

Thermal Analysis

Glass transition temperature ($T_g$) and melting point ($T_m$) were determined by differential scanning calorimetry (DSC) performed according to ASTM D3418-08.

$^1$H-NMR Spectroscopy

Characterization of polymers was done using a 500 MHz Agilent DD2 NMR spectrometer equipped with a 5 mm PFG $^{13}$C-$^{31}$P/{$^1$H, $^{19}$F} AutoX probe. Typical experimental parameters for 1H data collection were: sample at 25° C., 8 scans, 30 sec recycle delay, 12886 Hz spectral width and 2.5 sec acquisition time. Typical processing parameters for 1H data were: zero-filling to 64K points and exponential multiplication of 0.3 Hz prior to Fourier transform.spectra. Tetrachloroethane (tce-d2) was used as solvent.

Wide Angle X-ray Scattering (WAXS)

Characterization of polymers were made on a PANalytical X'Pert MPD diffractometer equipped with a Curved Graphite Monochromator producing Cu K-Alpha radiation (wavelength=1.5418). Measurement conditions: 0.5 degree divergence slit, 0.5 degree anti-scatter slit and 0.3 mm receiving slit, and generator setting of 45 kV, 40 mA. The data are collected in reflection geometry. The diffraction scan range is 4 to 40 degrees two-theta with a step size of 0.05 degrees. During the measurement the sample is rotated 2 seconds per revolution with a counting time of 5 seconds per step. WAXS generates a diffraction pattern from which crystallinity is measured and depicted as a crystallinity index (CI). CI is defined as the percentage of the total area of the crystalline peaks relative to the total area of the crystalline peaks and the amorphous regions in the XRD pattern. CI can range from 0 (amorphous) to 100 (fully crystalline). It should be noted that crystallinity indices calculated by such procedures do not give absolute values of crystallinity, but produces values that are proportional to crystallinity. Polymers were tested at ambient temperature from either as produced or recrystallized samples.

Materials

As used in the Examples below, 1,3-propanediol (BioPDO™), and 10 mils thick Kapton® polyimide film, were obtained from the DuPont Company (Wilmington, Del.) and were used as received, unless otherwise noted. Titanium(IV)isopropoxide (TPT), titanium(IV)isobutoxide (TBT), trimethyltrimellitate (TMTM), and poly(tetrahydrofuran) aka poly(tetramethyleneglycol) aka PTMEG aka Terathane® (1000D, or 1400D) were obtained from Aldrich and used as received. 2,5-furandimethylester (FDME) was obtained from AstaTech Inc. (Bristol, Pa.) and used as received. Irganox® 1019, and Irganox® 1098 were obtained and used as received. Plasthall® 809, polyethylene glycol (MW 400 g/mol) bis(2-ethylhexanoate), was obtained from HallStar (Chicago, Ill.). Licomont® NaV 101, sodium montanate, was obtained from Clariant (Charlotte, N.C.).

Preparation of Poly(trimethylene furandicarboxylate) (PTF) from FDME and BioPDO™

Several batches of poly(trimethylene furandicarboxylate) (PTF), as shown below were synthesized on a lab scale and also on a large scale. Table 1 summarizes the properties of PTF obtained from different batches.

Control A: Preparation of PTF from FDME and BioPDO™ (PTF-A)

For a theoretical polymer yield of 133 g: Bio-PDO (93 g, 1.22 mol), FDME (125 g, 0.678 mol), and Irganox-1010 (0.26 g) were charged to a pre-dried 500 mL three necked round bottom flask. An overhead stirrer and a distillation condenser were attached. The reactants were stirred at a speed of 50 rounds per minute (rpm) and the reaction mass was kept under nitrogen ($N_2$) purge atmosphere, the condenser was kept at 23° C. The contents were degassed three times by evacuating down to 100 Torr and refilling back with $N_2$ gas. Tyzor® TPT catalyst [78 mg or 82 µL] was added after the first evacuation. The flask was immersed into a preheated metal bath set at 160° C. and allowed to equilibrate for 20 minutes to melt the solids. The temperature was increased to 180° C. and held for 60 minutes after which the temperature was increased to 210° C. and held for an additional 60 minutes to complete the ester interchange and distillation of methanol. The nitrogen purge was closed and a vacuum ramp started, after about 60 minutes the vacuum reached a value of 50-60 mTorr. The temperature was increased to 230° C. and the reaction held under vacuum for 3 hours with stirring at 50-180 rpm. Periodically, the stirring speed was adjusted to 180 rpm, and then the stirrer was stopped. The stirrer was restarted, and the applied torque about 5 seconds after startup was measured. The over-head stirrer was stopped and elevated from the floor of the reaction vessel before the vacuum was turned off and the system purged with $N_2$ gas. The kettle reactor was separated and the product decanted and allowed to cool under a purge of nitrogen. Yield ~120 g.

$^1$H-NMR (TCE-d) δ: 7.05 (s, 2H), 4.40 (m, 4H), 2.15 (m, 2H).

$M_n$ (SEC)~19 500D, PDI 1.8.

The crystallinity index from WAXS was measured at 0 of the as produced polymer, and 19 of a polymer sample recrystallized at 115° C. for 6 hours.

Control B: Preparation of PTF from FDME and BioPDO™ (PTF-B)

For a theoretical polymer yield of 106 g: 2,5-furandimethylester (100 g, 0.54 mol) and BioPDO™ (74.4 g, 0.98 mol) were charged to a pre-dried 500 mL three necked round bottom flask fitted with an overhead stirrer and a distillation condenser. A nitrogen purge was applied to the flask which was at 23° C., and stirring was commenced at 50 rpm to form a slurry. While stirring, the flask was evacuated to 100 Torr and then repressurized with $N_2$, for a total of 3 cycles. After the first evacuation and repressurization, 63 mg of Tyzor® titanium (IV) isopropoxide available from the DuPont Company was added.

After the 3 cycles of evacuation and repressurization, the flask was immersed into a preheated liquid metal bath set at 160° C. The contents of the flask were stirred for 20 minutes after placing it in the liquid metal bath, causing the solid ingredients to melt, after which the stirring speed was increased to 180 rpm and the liquid metal bath setpoint was increased to 180° C. After about 20 minutes, the bath had come up to temperature. The flask was then held at 180° C. still stirring at 180 rpm for an additional 120 minutes to distill off most of the methanol being formed in the reaction. Following the hold period at 180° C., the nitrogen purge was discontinued, and a vacuum was gradually applied in increments of approximately −10 Torr every 10 seconds while stirring continued. After about 60 minutes the vacuum leveled out at 50-60 mTorr. The stirring speed was decreased to 50 rpm and the liquid metal bath setpoint was increased to 230° C. After about 20 minutes, the bath had come up to temperature and the conditions maintained for ~3 hours.

Periodically, the stirring speed was reduced to 180 rpm, and then the stirrer was stopped. The stirrer was restarted, and the applied torque about 5 seconds after startup was measured. The overhead stirrer was elevated from the floor of the reaction vessel and then the vacuum was turned off and the system purged with $N_2$ gas. The thus formed polymer product was allowed to cool to ambient temperature and the product recovered after carefully breaking the glass with a hammer. Yield ~95 g.

$^1$H-NMR (TCE-d) δ: 7.05 (s, 2H), 4.40 (m, 4H), 2.15 (m, 2H).

$M_n$ (SEC)~10 300 D, PDI~2.0. IV~0.57 dL/g.

Control C: Large-scale synthesis of PTF from FDME and BioPDO™ (PTF-C)

Step 1: Preparation of PTF Pre-Polymer by Polycondensation of bioPDO™ and FDME 2,5-furandimethylester (27000 g), 1,3-propanediol (20094 g), titanium (IV) butoxide (40.8 g), were charged to a 100-lb stainless steel stirred reactor equipped with a stirring rod, agitator, and condenser tower. A nitrogen purge was applied and stirring was commenced at 51 rpm to form a slurry. While stirring, the reactor was subject to a weak nitrogen purge to maintain an inert atmosphere. While the autoclave was heated to the set point of 243° C. methanol evolution began at a batch temperature of ~158° C. Methanol distillation continued for 265 minutes during which the batch temperature increased from 158° C. to 244° C. Following completion of the methanol distillation a vacuum ramp was initiated that during 120 minutes reduced the pressure from 760 Torr to 1 Torr. The mixture, when at 1 Torr, was left under vacuum and stirring for 165 min, reaching a minimum pressure of 0.56 Torr in addition to periodic reduction in the stirring rate, after which nitrogen was used to pressurize the vessel back to 760 Torr.

The formed polymer was recovered by pumping the melt through an exit valve at the bottom of the vessel and into a water quench bath. The thus formed strands were strung through a pelletizer, equipped with an air jet to dry the polymer free from moisture, cutting the polymer strand into pellets. Yield was approximately 24710 g. IV~0.63 dL/g.

This preparation was repeated nine more times.

Step 2: Processing of Remainder PTF Polymer from Step 1

Each of the ten preparations described in Step 1 typically resulted in approximately 3 kg remainder PTF polymer that is either not converted into pellets or is outside the specification for pellet size. This remainder includes pellets, uncut strands, and solid polymer collected during the pelletization process and removal of the polymer melt from the reactor. The remainder collected in each of the ten preparations of Step 1 was combined and further upgraded into more usable form of product. The solid portions were frozen with liquid nitrogen and broken into small pieces with a hammer. The total remainder was then cryo-ground in a hammer mill to produce a mixture of powder and polymer particles. The ground remainder was then melt processed using a 30 mm twin-screw extruder (ZSK 30 by Coperion) operating at a barrel temperature of 230° C. and a mass throughput of 30 lb/h. The polymer melt was extruded through a single hole die and into a water quench bath. The thus formed strand was strung through a pelletizer, equipped with an air jet to dry the polymer free from moisture, cutting the polymer strand into pellets. Yield of the processed remainder was approximately 27100 g of pellets. IV~0.63 dL/g.

The SEC analysis showed that the polyester had $M_n$ (SEC) 13,120 Da and PDI 2.2.

TABLE 1

Thermal properties of the as-prepared PTF

| Example | PTF, $M_n$ (D) | PDI | $T_g$ (° C.) | $T_{cc}$ (C.)* | $\Delta H_{cc}$ (J/g) | $T_m$ (° C.) | $\Delta H_m$ (J/g)* |
|---|---|---|---|---|---|---|---|
| Control A (PTF-A) | 19,500 | 1.8 | 58 | not detected | — | 175 (weak) | <<1 |
| Control B (PTF-B) | 10,300 | 2.0 | 58 | 142 | <<1 (0.25) | 175 | <<1 (0.22) |
| Control C (PTF-C) | 13,120 | 2.2 | — | — | — | — | — |

Example 1: Synthesis and Thermal Properties From Copolyesters Produced from BioPDO™, FDME, and PTMEG (Furan-PTMEG)

Copolyesters comprising a Furan-PTMEG soft segment and PTF were prepared from bioPDO, FDME and PTMEG with varying amount of Furan-PTMEG soft segment.

PTF Hard Segment      Furan-PTMEG Soft Segment

Example 1.1 Preparation of a Copolyester Comprising 50 wt % of Furan-PTMEG Soft Segment and 50 wt % of PTF Hard Segment (Furan-PTMEG-1.1)

For a theoretical polymer yield of 150 g: BioPDO™ (59.8 g, 0.78 mol), FDME (72.5 g, 0.393 mol), PTMEG (77.3 g, 55.2 mmol), TMTM (115 mg, 0.45 mmol), Irganox® 1019 (225 mg), and Irganox® 1098 (225 mg) were charged to a pre-dried three necked 500 mL kettle reactor. An overhead stirrer and a distillation condenser were attached. The reactants were stirred at a speed of 50 rounds per minute (rpm) and the reaction mass was kept under nitrogen ($N_2$) purge atmosphere, the condenser was kept at 23° C. The contents were degassed three times by evacuating down to 100 Torr and refilling back with $N_2$ gas. TBT catalyst [0.3 g or 0.31 mL] was added after the first evacuation. The flask was immersed into a preheated metal bath set at 160° C. and allowed to equilibrate for 20 minutes to melt the solids. The temperature was increased to 180° C. and held for 60 minutes after which the temperature was increased to 210° C. and held for an additional 60 minutes to complete the ester interchange and distillation of methanol. The nitrogen purge was closed and a vacuum ramp started, after about 60 minutes the vacuum reached a value of 50-60 mTorr. The temperature was increased to 230° C. and the reaction held under vacuum for 3 hours with stirring at 50-180 rpm. Periodically, the stirring speed was adjusted to 180 rpm, and then the stirrer was stopped. The stirrer was restarted, and the applied torque about 5 seconds after startup was measured. The over-head stirrer was stopped and elevated from the floor of the reaction vessel before the vacuum was turned off and the system purged with $N_2$ gas. The kettle reactor was separated and the product decanted and allowed to cool under a purge of nitrogen. Yield ~126 g.

$^1$H-NMR (TCE-d) δ: 7.05 (s, 2H), 4.40 (m, 4H), 3.35 (m, 4H), 2.15 (m, 2H).

$M_n$ (SEC)~12 000 D, PDI 2.4.

Furan-PTMEG soft segment content was estimated to be ~54 wt % (~56 mol %) from $^1$H-NMR (TCE-d) analysis by comparing Furan-PTMEG soft segment content (~3.35 ppm) with PTF hard segment content (~7.15 ppm).

Example 1.2 Preparation of a Copolyester Comprising 25 wt % of Furan-PTMEG Soft Segment and 75 wt % of PTF Hard Segment (Furan-PTMEG-1.2)

A copolyester was prepared using the procedure described in the Example 1.1 except using these amounts: BioPDO™ (87.2 g, 1.14 mol), FDME (105.6 g, 0.573 mol), PTMEG (37.6 g, 37.6 mmol), TMTM (162 mg, 0.63 mmol), Irganox® 1019 (225 mg), and Irganox® 1098 (225 mg). Yield ~106 g.

$^1$H-NMR (TCE-d) δ: 7.05 (s, 2H), 4.40 (m, 4H), 3.35 (m, 4H), 2.15 (m, 2H).

$M_n$ (SEC)~15 700 D, PDI 2.0.

Furan-PTMEG soft segment content was estimated to ~26 wt % (~28 mol %) from $^1$H-NMR (TCE-d) analysis by comparing Furan-PTMEG soft segment content (~3.35 ppm) with PTF hard segment content (~7.15 ppm).

Example 1.3 Preparation of a Copolyester Comprising 5 wt % of Furan-PTMEG Soft Segment and 95 wt % of PTF Hard Segment (Furan-PTMEG-1.3)

A copolyester was prepared using the procedure described in the Example 1.1 except using these amounts: BioPDO™ (110.6 g, 1.454 mol), FDME (133.8 g, 0.727 mol), PTMEG (7.51 g, 7.51 mmol), TMTM (162 mg, 0.63 mmol), Irganox® 1019 (225 mg), and Irganox® 1098 (225 mg). Yield ~110 g.

$^1$H-NMR (TCE-d) δ: 7.05 (s, 2H), 4.40 (m, 4H), 3.35 (m, 4H), 2.15 (m, 2H).

$M_n$ (SEC)~20 600 D, PDI 2.1.

Furan-PTMEG soft segment content was estimated to be 5.5 wt % (~6.1 mol %) from $^1$H-NMR (TCE-d) analysis by comparing Furan-PTMEG soft segment content (~3.35 ppm) with PTF hard segment content (~7.15 ppm).

Example 1.4 Preparation of a Copolyester Comprising 2.5 wt % of Furan-PTMEG Soft Segment and 97.5 wt % of PTF Hard Segment (Furan-PTMEG-1.4)

A copolyester was prepared using the procedure described in the Example 1.1 except using these amounts: BioPDO™ (110.6 g, 1.454 mol), FDME (133.8 g, 0.727 mol), PTMEG (3.75 g, 3.75 mmol), TMTM (162 mg, 0.63 mmol), Irganox® 1019 (225 mg), and Irganox® 1098 (225 mg). Yield ~83 g.

$^1$H-NMR (TCE-d) δ: 7.05 (s, 2H), 4.40 (m, 4H), 3.35 (m, 4H), 2.15 (m, 2H).

$M_n$ (SEC)~18 800 D, PDI 2.2.

Furan-PTMEG soft segment content was estimated to be 2.4 wt % (~2.7 mol %) from $^1$H-NMR (TCE-d) analysis by comparing Furan-PTMEG soft segment content (~3.35 ppm) with PTF hard segment content (~7.15 ppm).

Example 1.5 Preparation of a Copolyester Comprising 1 wt % of Furan-PTMEG Soft Segment and 99 wt % of PTF Hard Segment (Furan-PTMEG-1.5)

A copolyester was prepared using the procedure described in the Example 1.1 except using these amounts: BioPDO™

(110.6 g, 1.454 mol), FDME (133.8 g, 0.727 mol), PTMEG (1.5 g, 1.5 mmol), TMTM (162 mg, 0.63 mmol), Irganox® 1019 (225 mg), and Irganox® 1098 (225 mg). Yield ~82 g.

$^1$H-NMR (TCE-d) δ: 7.05 (s, 2H), 4.40 (m, 4H), 3.35 (m, 4H), 2.15 (m, 2H).

$M_n$ (SEC)~18 000 D, PDI 2.1.

Furan-PTMEG soft segment content was estimated to be 0.9 wt % (~1.0 mol %) from $^1$H-NMR (TCE-d) analysis by comparing Furan-PTMEG soft segment content (~3.35 ppm) with PTF hard segment content (~7.15 ppm).

The crystallinity index from WAXS was measured at 0 of the as produced polymer, and 31 of a polymer sample recrystallized at 115° C. for 6 hours.

Example 1.6 Preparation of a Copolyester Comprising 0.5 wt % of Furan-PTMEG Soft Segment and 99.5 wt % of PTF Hard Segment (Furan-PTMEG-1.6)

A copolyester was prepared using the procedure described in the Example 1.1 except using these amounts: BioPDO™ (110.6 g, 1.454 mol), FDME (133.8 g, 0.727 mol), PTMEG (0.6 g, 0.6 mmol). Yield ~90 g.

$^1$H-NMR (TCE-d) δ: 7.05 (s, 2H), 4.40 (m, 4H), 3.35 (m, 4H), 2.15 (m, 2H).

$M_n$ (SEC)~10 000 D, PDI 2.08.

Furan-PTMEG soft segment content was estimated to be 0.5 wt % (~0.5 mol %) from $^1$H-NMR (TCE-d) analysis by comparing Furan-PTMEG soft segment content (~3.35 ppm) with PTF hard segment content (~7.15 ppm).

Thermal Properties

A summary of thermal properties of Examples 1.1-1.6 and Control A is given in Table 2 below. All recorded transitions were recorded on the second heating from a heat-cool-heat scan (−100 to 200° C., 200 to −100° C., −100 to 200° C.) using a heating rate of 10° C./min. There is an unexpected and remarkable difference for the ability of copolyesters comprising a Furan-PTMEG soft segment to crystallize from the glass (second heating scan) as compared with the Control A, PTF.

Table 2 demonstrates that there is an increase in crystallinity on going from PTF with no soft segment (Control A) to copolyesters comprising a small amount of Furan-PAEG soft segment, such as 1 wt % of Furan-PTMEG soft segment (Example 1.6), as shown by the dramatic increase in the enthalpy of melting, $\Delta H_m$ from less than 1 to about 38 J/g at approximately 175° C.

Example 2: Preparation of a Film (Film-Furan-PTMEG-1.5) From a Copolyester Comprising 1 wt % of Furan-PTMEG Soft Segment The copolyester (Furan-PTMEG-1.5) comprising 1 wt % Furan-PTMEG soft segment from Example 1.5 disclosed hereinabove was pressed into 0.15-0.20 millimeter thick film using a heated Pasadena press (Model #: P-1250, Pasadena company). Two films were created for each sample. As a general procedure, square polymer films were made from a cut mold produced from a 0.25 millimeter thick Kapton® polyimide film. The polymer sample and the Kapton® film was placed between two sheets of fiberglass reinforced Teflon® and into the Pasadena press. Each sample was preheated at 0 pressure for 8 minutes at 275 C. It was subject to a pressure of 5000 psig for 7 minutes. After the indicated time, the plates were removed from the press and the film quenched in an ice bath. The produced film was separated from the Teflon® sheet, and measured for their thermal properties using DSC. Table 3 below summarizes results from DSC scans (second heating) of the two prepared copolyester films, Film-Furan-PTMEG-1.5.

Control: Preparation of a PTF Film (Film-PTF-A)

A procedure similar to that described in Example 2 was used to prepare two films from PTF polymer of Control A (Film-PTF-A). Table 3 summarizes the results from the DSC scans (second heating) of the two prepared PTF films.

TABLE 2

Thermal properties of copolyesters

| | Polymer | | | | | | |
|---|---|---|---|---|---|---|---|
| | Copolyesters comprising a Furan-PTMEG soft segment and a PTF hard segment | | | | | | PTF |
| Example # | 1.1 | 1.2 | 1.3 | 1.4 | 1.5 | 1.6 | Control A |
| Soft segment feed wt % | 50 | 25 | 5 | 2.5 | 1 | 0.5 | n/a |
| PTMEG, $M_w$ (D) | 1400 | 1000 | 1000 | 1000 | 1000 | 1000 | n/a |
| CoPolyester $M_n$ (D) | 12000 | 15700 | 20600 | 18800 | 18000 | 10000 | 19500 |
| Copolyester PDI | 2.4 | 2 | 2.1 | 2.2 | 2.1 | 2.08 | 1.8 |
| $T_{g1}$ (° C.) (PTMEG) | −75 | −77 | −77 | −77 | −77 | — | n/a |
| $T_{g2}$ (° C.) (PTF) | 35 | 36 | 51 | 54 | 55 | — | 58 |
| $T_{cc}$ (° C.) | 94 | 98 | 112 | 120 | 124 | — | not detected |
| $T_m$ (° C.) | 165 | 165 | 172 | 175 | 175 | — | 175 (weak) |
| $\Delta H_m$ (J/g) | 12 | 26 | 39 | 36 | 38 | — | <<1 |

Heat-cool-heat scan (−100 to 200° C., 200 to −100° C., −100 to 200° C.) at 10° C./min.
$T_{g1}, T_{g2}$: Glass transition temperature,
$T_{cc}$: Recrystallization from the glass,
$T_m$: Melt transition,
$\Delta H_m$: Enthalpy of melting normalized with PTF hard segment content.

TABLE 3

Thermal properties of a copolyester film and a PTF film.

| Example # | $T_{g2}$ (° C.) | $T_{cc}$ (° C.) | $\Delta H_{cc}$ (J/g) | $T_m$ (° C.) | $\Delta H_m$ (J/g) |
|---|---|---|---|---|---|
| Film-Furan-PTMEG-1.5 | 54 | 123 | 50 | 174 | 44 |
| Film-PTF-A | 59 | not detected | — | 174 (weak) | 0.20 |

Heat-cool-heat scan (−100 to 200° C., 200 to −100° C., −100 to 200° C.) at 10° C./min.
$T_{g2}$: Glass transition temperature,
$T_{cc}$: Recrystallization from the glass,
$T_m$: Melt transition,
$\Delta H_m$: Enthalpy of melting normalized with RTF hard segment content.

The results summarized in Table 3 clearly demonstrate the ability of the films formed from copolyesters comprising Furan-PTMEG soft segment (Example 1.5) to readily crystallize from the glass, as shown by much larger enthalpy of recrystallization (50 J/g) and also enthalpy of melting (44 J/g) as compared to that of the film formed from PTF ($\Delta H_m$=0.2 J/g) at a heating rate of 10° C./min.

Example 3: Preparation of a Composition Comprising PTF and a Nucleating Agent

The PTF polymer of Control B was chopped into one inch sized pieces that were placed in liquid nitrogen for 5-10 minutes, followed by charging to a Wiley mill fitted with a 6 mm screen. Each sample was milled at ca. 1000 rpm to produce coarse particles characterized by a maximum dimension of about ⅛". The particles so produced were dried under vacuum and allowed to warm to ambient temperature.

The particles so prepared were dried overnight in a vacuum oven at 120° C. under a slight nitrogen purge. Sodium montanate was dried over night under vacuum. A blend of PTF with Sodium montanate (1 wt %) was prepared in a DSM microcompounder. The DSM system is a PC controlled 15 cubic centimeter (cc), co-rotating, intermeshing (self wiping), 2-tipped, conical twin-screw machine with a recirculation loop, discharge valve, nitrogen purge system, and with three different heating zones. A temperature of 210° C. was used for all three heat zones. The polymer melt temperature was in the range of 197-198° C. Under nitrogen PTF and the additive was charged and stirred at a speed of 100 rpm for a total mixing time of 5 minutes. Following the mixing time, the discharge valve was opened and an extruded ¼ inch wide strand collected after quenching in ambient tempered tap water. The strand was dried under vacuum and a summary of resulting thermal transitions are depicted in Table 4 below.

TABLE 4

DSC summary of Control A and Example 3

| Sample | Composition | $T_g$ (° C.) | *$T_{cm}$ (° C.) | $T_{cc}$ (° C.) | $\Delta H_{cc}$ (J/g) | $T_m$ (° C.) | $\Delta H_m$ (J/g) |
|---|---|---|---|---|---|---|---|
| Control A | PTF | 58 | — | 142 | 0.25 | 175 | 0.22 |
| Example 3* | PTF and 1 wt % of sodium montanate | 56 | 128 | 137 | 20.9 | 175 | 22.6 |

Heat-cool-heat scan (−100 to 200° C., 200 to −100° C., −100 to 200° C.) at 10° C./min.
*Using a cooling rate of 1° C./min, this blend of PTF and sodium montanate demonstrated recrystallization also from melt ($T_{cm}$). Measured $T_{cm}$ was 128° C.

The results shown in Table 4 demonstrate an unexpected ability of sodium montanate to crystallize PTF both from the glass and from the melt. This is unexpected and surprising result in view of U.S. Pat. No. 7,906,572, which relates to the use of 0.5-10 wt % of sodium montanate as crystallization inhibitor for poly(ethylene furandicarboxylate) (PEF). In contrast, Table 4 shows that sodium montanate when added to poly(trimethylene furandicarboxylate) (PTF) acts as a nucleating agent (crystallization promoter) for PTF.

Example 4: Preparation of a Composition Comprising PTF and a Nucleating Agent

Two compositions comprising PTF and a nucleating agent were prepared as described below in Example 4.1.

Example 4.1: Preparation of a Composition Comprising PTF and 1 wt % of Sodium Montanate The PTF polymer prepared in Control C was mixed with the ingredients shown in Table 5. Pre-weighed amounts of PTF polymer pellets were dried in individual glass jars in a vacuum oven at 120° C. overnight under a vacuum of about 25 inches of mercury (a pressure reading of about 5 inches or 2.5 psi), moderated by a slight nitrogen bleed. Covers for the jars were stored in a desiccator over Drierite®, until use. The jars of dried polymer were quickly removed from the oven and stored in a friction-top metal can with Drierite® desiccant.

A Brabender PlastiCorder® Model PL2000 mixer (C.W. Brabender® Instruments, Inc., South Hackensack, N.J. 07606) with Type 6 mixing head and a pair of counter-rotating stainless roller blades was pre-heated to a temperature of 200° C. 50.0 g of PTF was added to the mixer under a nitrogen blanket delivered through a ram sitting atop the mixing head at a rate slow enough to prevent over-torquing and stall-out of the motor. Pre-weighed amount of sodium montanate (0.5 g) was added and the materials were mixed at 200° C. for 10 minutes at 75 rpm, under a nitrogen blanket delivered through the ram to provide the PTF composition of Example 4.1.

At the end of the mixing time, the molten PTF composition was pushed out of the top opening of the mixing head by reversing the rotation of the roller blades and removed as soon as the rotation ceased. Upon removal at temperature from the Brabender PlastiCorder® mixer, the material was pressed as flat as possible while still molten. This fraction was subjected to analytical tests. Another fraction of molten materials was collected as soon as the mixing head was disassembled. This fraction was not analyzed. The remainder of the polymer which could not be removed quickly was discarded.

A small portion of the PTF composition was analyzed by DSC and the results are summarized in Table 5. All reported transitions in Table 5 were recorded on the first cooling scan and the second heating from a heat-cool-heat scan (−80 to 230° C., 230 to −80° C., −80 to 230° C.) using heating and cooling rates of 10° C./min.

Example 4.2: Preparation of a Composition Comprising PTF and 2.4 wt % of Sodium Montanate A procedure similar to that described in Examples 4.1 was used except that different amount of sodium montanate (1.25 g) was added to PTF (50.0 g) of Control C to prepare a composition comprising PTF and a nucleating agent (sodium montanate). Table 5 summarizes the composition and results from the DSC analysis.

Example 5: Preparation of a Composition Comprising PTF and a Plasticizer

A procedure similar to that described in the Examples 4.1 and 4.2 was used except that polyethylene glycol bis(2-ethylhexanoate) (5.0 g) was added instead of sodium montanate to PTF (45.0 g) of Control C to prepare a composition comprising PTF and a plasticizer. Table 5 summarizes the composition and results from the DSC analysis.

Example 6: Preparation of a Composition Comprising PTF, a Nucleating Agent, and a Plasticizer A procedure similar to that described in Examples 4.1 and 4.2 was used except that polyethylene glycol bis(2-ethylhexanoate) (2.5 g) was added in addition to sodium montanate (1.25 g) to PTF (47.5 g) of Control C to prepare a composition comprising PTF, a nucleating agent (sodium montanate) and a plasticizer (polyethylene glycol bis(2-ethylhexanoate)). Table 5 summarizes the composition and results from the DSC analysis.

Control D: Processed PTF with No Nucleating Agent or Platicizer

A procedure similar to that described in Examples 4.1 and 4.2 was used except that only PTF (50.0 g) was used and no additives (sodium montanate or polyethylene glycol bis(2-ethylhexanoate)) were added to prepare a processed PTF, Control D. Table 5 summarizes the results from the DSC analysis.

increase in crystallinity is shown by the increase in the enthalpy of melting ($\Delta H_m$) of these materials at approximately 165° C. The materials with a higher enthalpy of melting have more crystallinity as the melting point is approached. Examples show a desirable increase in the degree of crystallization that occurs during cold crystallization, as measured by $\Delta H_{cc}$, and in the degree of crystallinity at or near the melting point, as measured by $\Delta H_m$. As can be seen from Examples 4.1 and 4.2, the degree of crystallinity can be increased by increasing the amount of nucleating agent from 1 wt % to 2.4 wt %. As disclosed hereinabove, these results are unexpected and surprising in view of U.S. Pat. No. 7,906,572, which teaches the use of 0.5-10 wt % of sodium montanate as crystallization inhibitor for poly(ethylene furandicarboxylate), which is opposite of the effect shown in Table 5 above, where sodium montanate is acting as a nucleating agent (crystallization promoter) for poly (trimethylene furandicarboxylate).

Furthermore, Examples 5 and 6 show that though composition comprising PTF and a plasticizer exhibits crystallinity, crystallinity of such a composition can be further increased by adding a nucleating agent as in Example 6. It should be further noted that the total amount of additive is less in Example 6 (7.3 wt %) as compared to Example 5 (10 wt %), Example 6 has higher $\Delta H_{cc}$ and higher $\Delta H_m$ as compared to Example 5, thereby showing a synergistic effect of the presence of both a nucleating agent and a plasticizer in PTF.

TABLE 5

Thermal Properties of compositions comprising PTF and one or more of a nucleating agent and a plasticizer

| | Composition | | | | |
|---|---|---|---|---|---|
| | Processed PTF | PTF + Nucleating Agent | | PTF + Plasticizer | PTF + Nucleating Agent + Plasticizer |
| Example | Control D | Example 4.1 | Example 4.2 | Example 5 | Example 6 |
| PTF (Control C), wt % | 100.0 | 99.0 | 97.6 | 90.0 | 92.7 |
| Sodium montanate, wt % | — | 1.0 | 2.4 | — | 2.4 |
| polyethylene glycol bis(2-ethylhexanoate), wt % | — | — | — | 10.0 | 4.9 |
| $T_g$ (PTF segment), ° C. | 49 | 49 | 51 | 44 | 41 |
| $T_{cc}$, ° C. | Not detected | 134 | 131 | 133 | 102 |
| $\Delta H_{cc}$, J/g | <<1 | 5 | 14 | 6 | 38 |
| $T_m$, ° C. | Not detected | 165 | 165 | 166 | 166 |
| $\Delta H_m$, J/g | <<1 | 5 | 14 | 6 | 35 |

Heat-cool-heat scan (−80 to 230° C., 230 to −80° C., −80 to 230° C.) at 10 ° C./min.
$T_g$: Glass transition temperature,
$T_{cc}$: Recrystallization from glass,
$T_m$: Melt transition,
$\Delta H_m$: Enthalpy of melting normalized with PTF hard segment content.

Table 5 shows that although processed PTF (Control D) is difficult to crystallize, addition of nucleating agent or plasticizer to PTF, as in Examples 4.1-6 results in compositions exhibiting unexpected and remarkable ability to crystallize on the second heating scan when heated above the glass transition temperature. This crystallization occurs at the cold crystallization temperature ($T_{cc}$) and the magnitude of the cold crystallization is given by the heat of cold crystallization ($\Delta H_{cc}$). This cold crystallization affords a crystallinity to the materials that improves their physical properties. The

Example 7: Preparation of a Copolyester Comprising 13.4 wt % of Furan-PTMEG Soft Segment and 86.6 wt % of PTF Hard Segment The copolyester comprising 13.4 wt % Furan-PTMEG soft segment and 86.6 wt % PTF was prepared in three batches, designated 7A, 7B, and 7C. BioPDO™, PTMEG (1000 D), and FDME with amounts listed in Table 6 were charged to a 300 mL kettle flask, equipped with a condenser and an overhead high torque stirrer (Eurostar Power Control IKA-WERKE). The flask and contents were evacuated and backfilled with nitrogen. The amount of Tyzor® TPT catalyst listed in Table 4 was added, and the flask was again evacuated and backfilled with nitrogen three times. The contents were stirred. The flask was immersed into a preheated tin-bismuth metal bath set at 160° C. and allowed to equilibrate for 5-15 minutes to melt the solids The temperature was increased to 180° C. and held for 80-85 minutes after which the temperature was increased to 210° C. and held for an additional 100-135 minutes to complete the ester interchange and distillation of methanol. A vacuum ramp was started after 165-185 minutes of reaction time. After another 30-40 minutes, the vacuum reached a value of 30 Torr. At this point, the temperature was increased to 235° C. and held there for the duration of the reaction. The vacuum reached a value of 150 mTorr about 45-95 minutes after the vacuum ramp was begun and 100 mTorr in another 10-30 minutes. The vacuum and heat were discontinued after a total of 425-445 minutes with about 215-220 minutes at maximum temperature of 235° C. The yield of the recovered copolyester for each batch is recorded in Table 6.

The polymer was broken into small pieces about 1 inch in diameter, cooled in liquid nitrogen and milled in a Wiley Mill, the recovered polymer recorded in Table 6. From each milled batch, 1.5 g was removed for analysis. Equal amounts of the three batches were mixed by dissolving in a solvent and the mixture was analyzed by SEC. The SEC analysis showed that the mixture had $M_n$ (SEC) 6900 D and PDI 2.4.

The milled pieces of batches 7A, 7B, and 7C were combined and tumbled together to mix them, to give a total weight of 355.0 g. This mixture of three batches will be referred to as the copolyester of Example 7 and was used in preparing compositions of copolyester with PTF, a nucleating agent and/or a plasticizer.

TABLE 6

Preparation of copolyester of Example 7

| Batch # | 7A | 7B | 7C |
|---|---|---|---|
| BioPDO ™, g | 68.98 | 103.5 | 103.5 |
| PTMEG 1000, g | 12.00 | 18.00 | 18.00 |
| FDME, g | 83.46 | 125.3 | 125.3 |
| Titanium (IV) isopropoxide, g | 0.186 | 0.279 | 0.279 |
| Polymer recovered after reaction, g | 88.1 | 137.5 | 138.2 |
| Polymer recovered after milling, g | 87.4 | 134.8 | 135.4 |

Example 8: Preparation of a Composition Comprising the Copolyester of Example 7 and a Plasticizer A portion of the copolyester of Example 7 was dried overnight in glass jars as described for drying of PTF polymer in Example 4. A procedure similar to that described in Example 4 was used to prepare a composition by adding polyethylene glycol bis(2-ethylhexanoate) (2.5 g) to the melt of copolyester (47.5 g) of Example 7.

A small portion of the composition was analyzed by DSC and the results are summarized in Table 7. All reported transitions were recorded on the first cooling scan and the second heating scan from a heat-cool-heat scan (−80 to 230° C., 230 to −80° C., −80 to 230° C.) using heating and cooling rates of 10° C./min.

Example 9: Preparation of a Composition Comprising the Copolyester of Example 7, a Nucleating Agent and a Plasticizer A procedure similar to that described in Examples 4 and 8 was used to prepare a composition by adding sodium montanate (1.25 g) in addition to polyethylene glycol bis (2-ethylhexanoate) (2.50 g) to the melt comprising copolyester (47.5 g) of Example 7. A small portion of the composition was analyzed by DSC using procedure described in Example 8 and the results are summarized in Table 7.

Example 10: Preparation of a Composition Comprising the Copolyester of Example 7 and PTF of Control C A portion of the copolyester of Example 7 and a portion of PTF polymer prepared in Control C were separately dried overnight in glass jars as described for drying of PTF polymer in Examples 4-6. A procedure similar to that described in Example 4 was used to prepare a composition comprising 20.0 g of PTF of Control C and 30.0 g of copolyester of Example 7 by slowly adding PTF first to the pre-heated mixer, followed by the copolyester. A small portion of the composition was analyzed by DSC using procedure described in Example 8 and the results are summarized in Table 7.

Example 11: Preparation of a Composition Comprising the Copolyester of Example 7, PTF and a Nucleating Agent A procedure similar to that described in the Examples 4 and 8 was used to prepare a composition by adding sodium montanate (1.25 g) to the melt comprising PTF (20.0 g) of control C and copolyester (30.0 g) of Example 7. A small portion of the composition was analyzed by DSC using procedure described in Example 8 and the results are summarized in Table 7.

Example 12: Preparation of a Composition Comprising the Copolyester of Example 7, PTF and a Plasticizer A procedure similar to that described in the Examples 4 and 8 was used to prepare a composition by adding polyethylene glycol bis(2-ethylhexanoate) (3.0 g) to the melt comprising PTF (19.5 g) of control C and copolyester (27.5 g) of Example 7. A small portion of the composition was analyzed by DSC using procedure described in Example 8 and the results are summarized in Table 7.

Example 13: Preparation of a Composition Comprising the Copolyester of Example 7, PTF, a Nucleating Agent and a Plasticizer A procedure similar to that described in the Examples 4 and 8 was used to prepare a composition by adding sodium montanate (1.25 g) and polyethylene glycol bis(2-ethylhexanoate) (3.00 g) sequentially to the melt comprising PTF (19.5 g) of control C and copolyester (27.5 g) of Example 7. A small portion of the composition was analyzed by DSC using procedure described in Example 8 and the results are summarized in Table 7.

TABLE 7

Thermal Properties of Copolyester compositions comprising one or more of PTF, a nucleating agent and a plasticizer

| Example | 8 | 9 | 10 | 11 | 12 | 13 |
|---|---|---|---|---|---|---|
| PTF (of Control C), wt % | — | — | 40.0 | 39.0 | 39.0 | 38.0 |
| Copolyester (of Example 7), wt % | 95.0 | 92.7 | 60.0 | 58.6 | 55.0 | 53.7 |
| Sodium montanate, wt % | — | 2.4 | — | 2.4 | — | 2.4 |
| polyethylene glycol bis(2-ethylhexanoate), wt % | 5.0 | 4.9 | — | — | 6.0 | 5.9 |
| $T_{cm}$, °C. (crystallization from melt) | — | 85 | — | — | — | — |
| $\Delta H_{cm}$, J/g | — | 36 | — | — | — | — |
| $T_g$ (PTF segment), °C. | 30 | 34 | 44 | 45 | 41 | 39 |
| $T_{cc}$, °C. | 92 | — | 106 | 101 | 101 | 91 |
| $\Delta H_{cc}$, J/g | 41 | — | 35 | 36 | 37 | 35 |
| $T_m$, °C. | 171 | 171 | 169 | 169 | 169 | 169 |
| $\Delta H_m$, J/g | 43 | 43 | 36 | 36 | 39 | 39 |

Heat-cool-heat scan (−80 to 230° C., 230 to −80° C., −80 to 230° C.) at 10° C./min.
$T_g$: Glass transition temperature,
$T_{cc}$: Recrystallization from glass,
$T_{cm}$: Recrystallization from melt,
$T_m$: Melt transition,
$\Delta H_m$: Enthalpy of melting normalized with PTF hard segment content.

Examples 8-13 as summarized in Table 7 shows that compositions of copolyester comprising Furan-PTMEG soft segment exhibit ability to crystallize on the second heating scan when heated above the glass transition temperature.

Furthermore, Example 9 shows even more unexpected and remarkable result by exhibiting the ability to crystallize from the melt during the cooling scan. This is an especially valuable property for a polymer during injection molding. This crystallization from the melt occurs at the crystallization temperature ($T_{cm}$) and the magnitude of the crystallization is given by the heat of crystallization ($\Delta H_{cm}$). It is further remarkable that the degree of crystallinity that is achieved during crystallization from the melt, as measured by $\Delta H_{cm}$ (36 J/g), is almost as large as the degree of crystallinity that is measured at or near the melting point, as measured by $\Delta H_m$ (43 J/g). Thus, a copolyester comprising Furan-PTMEG soft segment and PTF hard segment, when blended with a nucleating agent and a plasticizer is able to reach its maximum degree of crystallinity when cooled from the melt.

The results demonstrate the ability of sodium montanate to crystallize PTF both from the glass and from the melt.

What is claimed is:

1. A composition comprising:
   a) 80-99 wt % of poly(trimethylene-2,5-furandicarboxylate); and
   b) 1-20 wt % of a plasticizer of the formula:

A—O—[CHX—(CH$_2$)$_k$—O]$_j$—B, where
   k is an integer from 1 to 3,
   j is an integer from 4 to 25,
   A and B are each independently selected from an alkyl group, an acyl group, or an aroyl group, each containing 1 to 10 carbon atoms,
   X is H, CH$_3$ or C$_2$H$_5$,
   wherein the amounts are based on the total weight of the composition.

2. The composition of claim 1, further comprising 0.1-10 wt % of a neutralized carboxylic acid salt or trisodium phosphate as a nucleating agent, wherein the amounts are based on the total weight of the composition.

3. An article comprising the composition of claim 1, wherein the article is in the form of a sheet, film, or molded article.

4. The composition of claim 1, wherein the plasticizer is polyethylene glycol bis(2-ethylhexanoate).

5. The composition of claim 4, further comprising 0.1-10 wt % of a neutralized carboxylic acid salt or trisodium phosphate as a nucleating agent, wherein the amounts are based on the total weight of the composition.

6. An article comprising the composition of claim 4, wherein the article is in the form of a sheet, film, or molded article.

7. An article comprising the composition of claim 5, wherein the article is in the form of a sheet, film, or molded article.

\* \* \* \* \*